United States Patent [19]

Connell, Jr.

[11] Patent Number: 5,639,199
[45] Date of Patent: Jun. 17, 1997

[54] HAY PICKUP, DELIVERY SYSTEM FOR ROUND BALES

[76] Inventor: Carey Bascom Connell, Jr., 5381 College Dr., Graceville, Fla. 32440

[21] Appl. No.: 543,846

[22] Filed: Oct. 23, 1995

[51] Int. Cl.$^6$ .................................................. A01D 90/08
[52] U.S. Cl. .......................................... 414/24.5; 414/111
[58] Field of Search .................................. 414/24.5, 24.6, 414/111, 528

[56] References Cited

U.S. PATENT DOCUMENTS

| | | | |
|---|---|---|---|
| 2,266,698 | 11/1941 | Roberts | 414/24.5 |
| 4,053,070 | 10/1977 | Rozeboom | 414/111 X |
| 4,259,034 | 3/1981 | Ward et al. | 414/24.6 |
| 5,192,177 | 3/1993 | Cardinal | 414/528 X |
| 5,320,472 | 6/1994 | Matlack et al. | 414/111 |
| 5,333,981 | 8/1994 | Pronovost et al. | 414/24.5 |

*Primary Examiner*—Karen B. Merritt
*Assistant Examiner*—Janice L. Krizek

[57] ABSTRACT

A machine for retrieving, loading, transporting, and unloading round bales of hay, straw or other vegetative matter, capable of non-stop operation, loading round bales, transporting them to storage or feeding area and unloading them one at a time, all at once or any combination in between. This machine includes a fore and aft extending mobile chassis, either self propelled or towable, an operator's station at the front end of the chassis or on the tractor towing unit, an escalator mounted on the right front quadrant of the chassis and aligned fore and aft, sorting/alignment cradles aft of the escalator, mounted horizontally to the front edge of the chassis, an elongated, inclined transport platform and a bracing structure supporting the transport platform in an inclined relation above the mobile chassis with the front portion of the transport platform raised to the level of the sorting/aligning cradles and declining to the level of the retaining gates/unloading ramps at the rear of the machine. The transport platform is layered with rollers and has retaining gates/unloading ramps and intermediate retaining gates. The bale is retrieved and raised, by the escalator, to the sorting/alignment cradles, released by the sorting alignment cradles onto the transport platform and moved down the roller lined transport platform by gravity to the retaining gates or the unloading ramps. The bales can be unloaded individually or in multiple aggregates.

1 Claim, 5 Drawing Sheets

HAY PICKUP, DELIVERY SYSTEM FOR ROUND BALES

BACKGROUND OF THE INVENTION

1. Field of the Invention

This invention relates in general to farm machinery and in particular to a machine to retrieve, load, transport and unload large round bales of hay, in a non-stop action.

2. Prior Art

In an effort to reduce labor costs, farmers are, increasingly, utilizing large round hay balers. However, to move these bales, they originally relied on pronged forks mounted on the rear hitch of tractors. Each bale moved required a separate trip with the tractor, including much maneuvering and backing to line up the tractor and bale. Then a pronged fork was mounted on a front end loader. With a fork on the rear hitch and the front end loader, we could move two bales per trip, still requiring extensive time consuming maneuvering of the tractor.

Other methods of moving round bales such as trucks and/or trailers are used but they require additional equipment to load and unload the bales.

Later devices such as those disclosed in U.S. Pat. Nos. 5,320,472 (Matlack and Matlack), and 5,333,981 (Pronovost and Pronovost) are a step in the right direction but are better suited for large square bales. No device is known however that will pick up large bales without stopping, transport ten or more per trip, and unload them, singly or in precise numbers, without assistance.

SUMMARY OF THE INVENTION

The principal object of the present invention is to load several large round bales of hay, transport them to the storage area or feeding area, and unload these bales utilizing only one man and one machine, in a safe and efficient manner.

It is also an object of the present invention to accomplish the pickup of the round bales while moving, thereby eliminating or reducing stopping, backing and other maneuvering. This will save time, labor costs, fuel and reduce soil compaction.

Another object of the present invention is the adaptability to bales of varying sizes and volumes.

The foregoing objects can be accomplished by providing an escalator and guide arms, powered by hydraulic or electric motors, or other mechanical devices to pickup and raise the bales to roller-lined sorting and aligning cradles and then released on an inclined platform layered with rollers. The bales are held in place with guide rails and a hydraulically operated retainer gate/unloading ramp. In the preferred embodiment of the invention, it would be mounted on a heavy duty truck chassis equipped with a half cab and a power take off (PTO) unit to operate the variable speed hydraulic pump, electric generators, mechanical transmitting device or combination thereof, of sufficient size to power the escalator, sorting cradles and unloading ramps. For smaller farms with lower volume requirements, the invention could be mounted on a heavy duty trailer, pulled by a farm tractor with power supplied by the tractor PTO to the pumps or generators.

DETAILED DESCRIPTION OF THE INVENTION

Figure 1A:
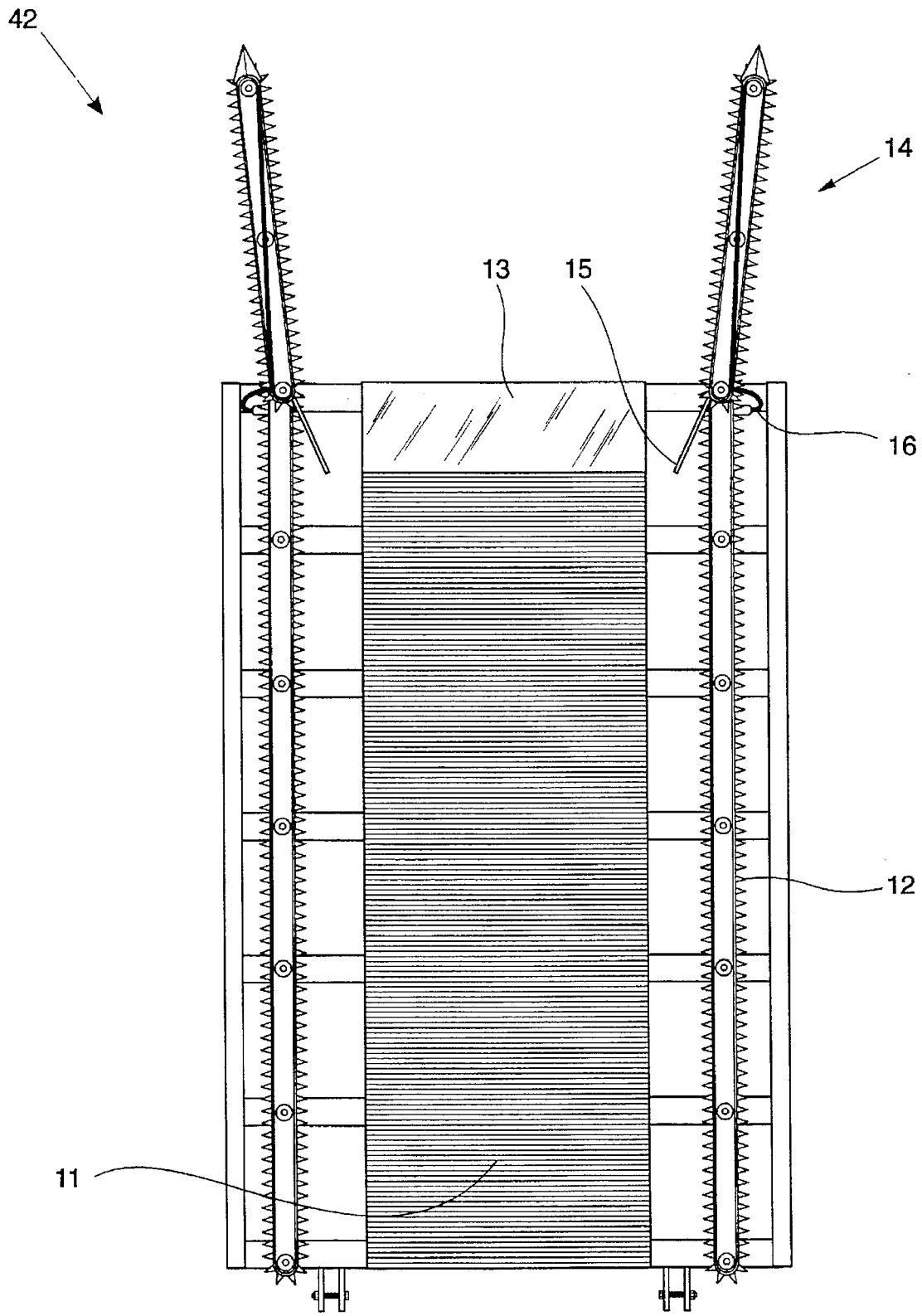
FIG. 1A is an overhead view of the loading end of the escalator in accordance with the present invention.
Figure 1B:
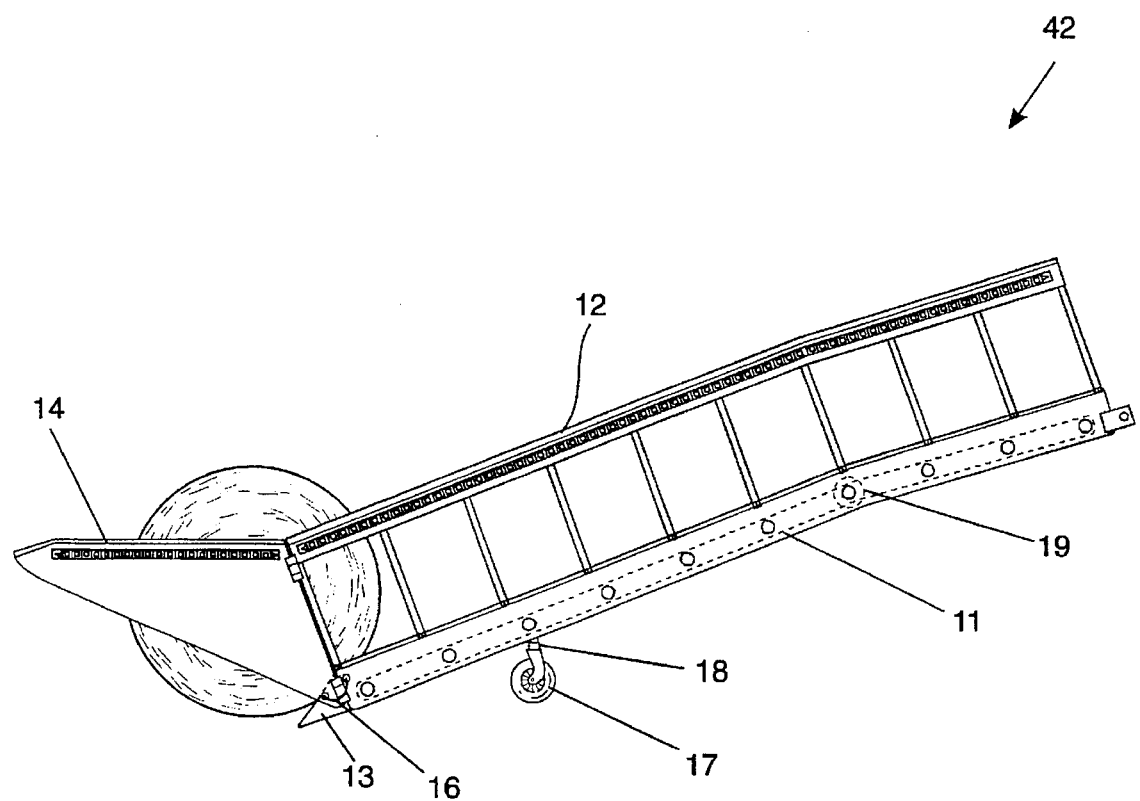
FIG. 1B is a simplified side view of the escalator, illustrating the front mounted flat metal plate, the gauge wheel, tension spring and escalator drive motor.

The present invention will be best described in the optimum application, mounted on a self-propelled chassis. However operation on a trailer pulled and powered by a farm tractor will be basically the same. The COE (cab over engine) chassis will have a half cab for the operator and the escalator will be attached, through the open area normally covered by the passenger portion of the cab, to the right front section of the frame containing the sorting/aligning cradles. It will be secured to the cradle frame by locking pins providing the capability of being released and raised by a lifting device during transport or for stowing. The center portion of the escalator 11, (an area approximately 42 inches wide) will have an endless roller belt, made of reinforced material and cleated, mounted over rollers to reduce drag and powered by a drive motor mounted on the escalator frame, to raise the bales from ground level to the sorting cradles. Adjustable guide rails 12, adjustable in width, on each side will compensate for varying size bales. These guide rails will have an endless drive chain, gear driven from the roller belt drive, to guide and assist in powering the bales up the escalator to the sorting/aligning cradles. The forward or feed end of the escalator frame will have a gauge wheel 17 mounted on the under side, slightly aft, to maintain ground clearance. A tension spring 18 on the gauge wheel 17 will allow a slight depression of the forward end of the escalator as the round bale moves upon the belt, yet will prevent the escalator from digging into the ground. A flat metal plate 13 covering the front edge of the escalator will slide under the bale as the escalator approaches, raising the bale onto the escalator belt. Movable guide arms 14, raised 32–36 inches above the ground with gear driven endless drive chains, extend forward to guide and align the bale onto the escalator. As the escalator is moved toward the bale and the bale enters the escalator mouth, the bale depresses flat metal plates 15 affixed to the movable guide arms 14. As the plates are depressed, they bring the movable guide arms inward, contacting the flat ends of the bale. The endless drive chains on the guide arms then assist in moving the bale up and on the escalator drive belt 11. As the bale moves up the escalator, past the flat metal plates 15, the movable guide arms 14 return to the open position to await the next bale. In the event a bale needs a small alignment adjustment, either of the movable guide arms 14 can be manually operated by the vehicle operator by means of the double extending hydraulic cylinders 16 located on the outside of each movable guide arm 14. Operating the normal extension range of either cylinder 16 will move the corresponding movable guide arm 14 inward, contacting the bale, allowing bale realignment. Activating both cylinders 16 to maximum extension will fold the movable arms 14 inward to the stowed position for transport or storage. The escalator is driven by a hydraulic or electric motor 19 with power supplied by a hydraulic pump, electric generator or mechanical transmitting device operating off the PTO. Drive shafts 17 extending outward from the escalator drive motors 19 will connect with and power the endless drive chains on the adjustable width guide rails 12 and the movable guide arms 14.

Figure 2:
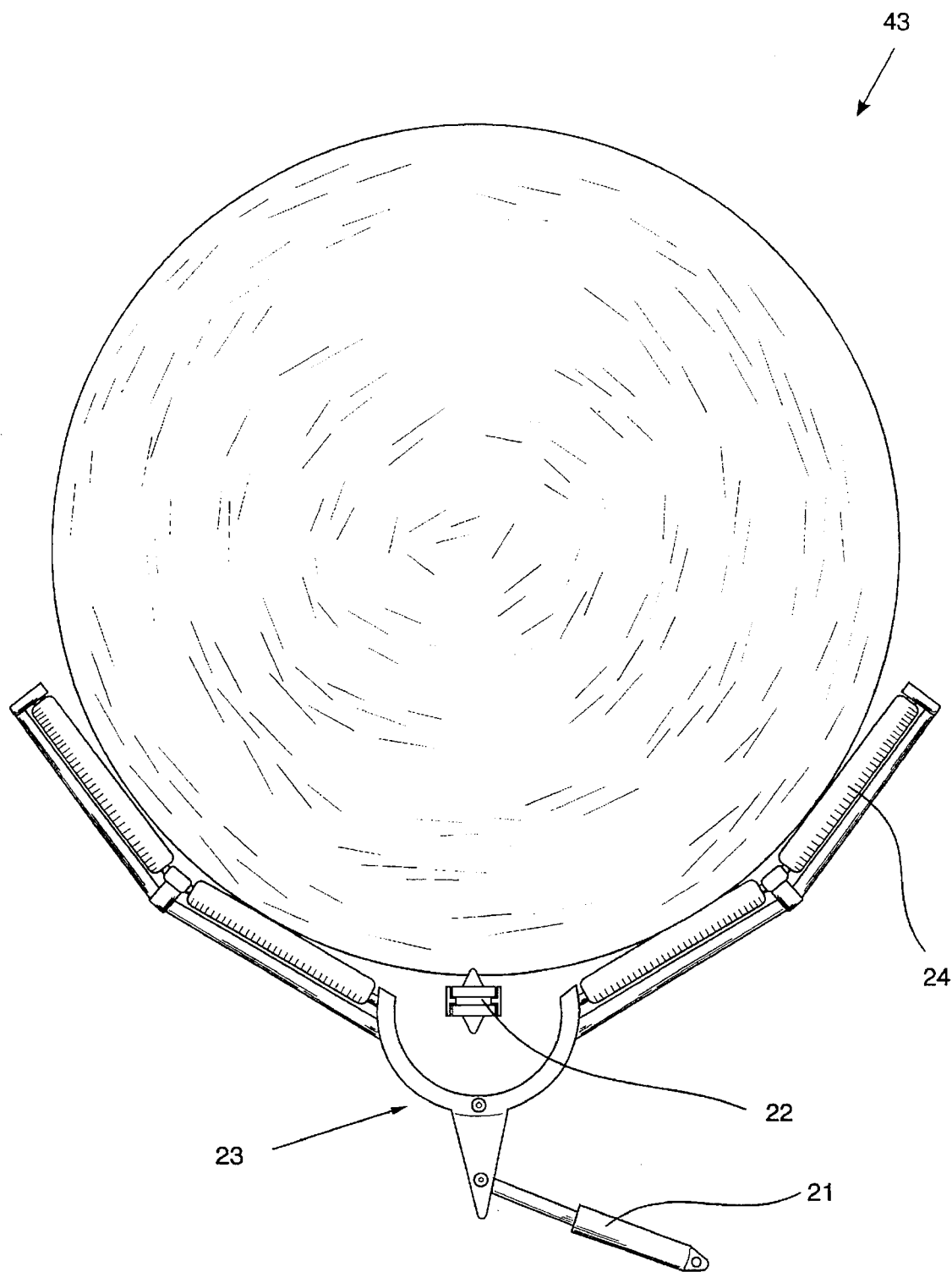
FIG. 2 is a simplified side view of the sorting/aligning cradles and hydraulic cylinder.
Figure 3:
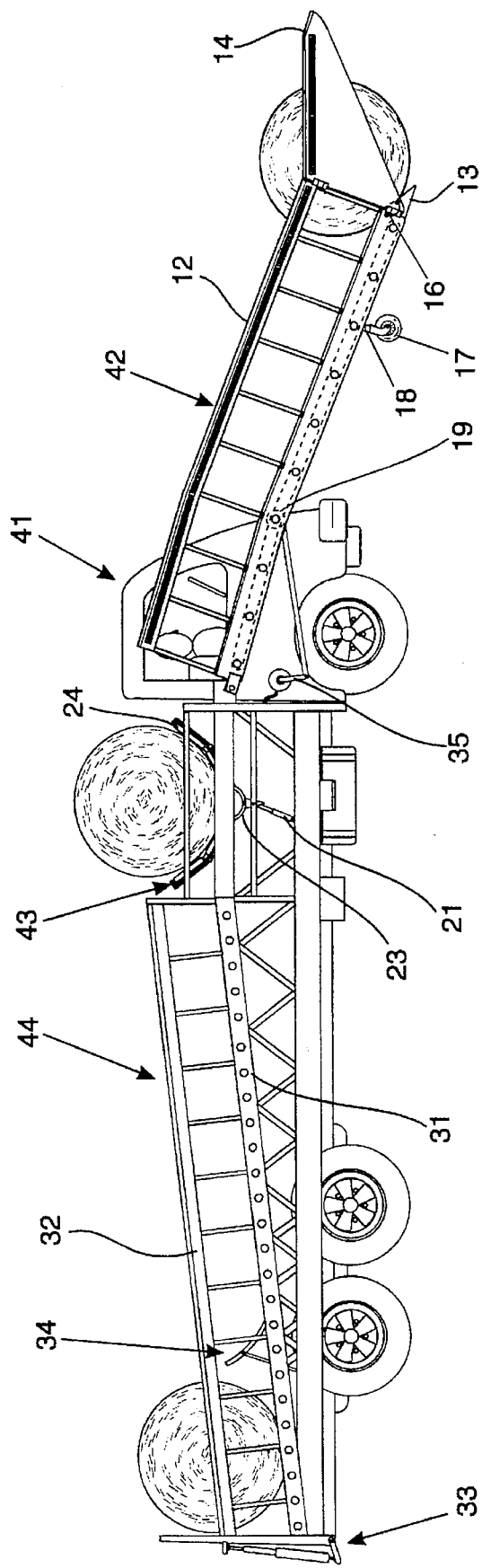
FIG. 3 is a side view of the present invention including escalator/loading ramp, sorting/aligning cradles, transport platform, intermediate retaining gate and retainer gate/unloading ramp.

As the round bale approaches the top of the escalator, the sorting/alignment cradle on the right side will tilt forward to receive the bale. The right side cradle (FIG. 2) is equipped with a double extension hydraulic cylinder 21. The left side sorting/alignment cradle only has a single extension hydraulic cylinder. The double extending hydraulic cylinder allows the right sorting/alignment cradle to tilt forward to receive the bale from the escalator, be held in an upright position for transport or sorting and tilted rearward allowing the round bale to be released down the right side of the inclined, roller layered, transport platform. The roller layered transport platform is divided into two sections, left and right, with center guide rails (adjustable for bale width) to keep the bales separated in the middle. Once the cradle has tilted forward and received the bale, the cradle is then brought back to the upright position. The cradle is then either tilted rearward and the bale is released or the cradle remains upright and the sorting drive 22, a powered drive mechanism that extends just above the bottom curved portion 23 of both sorting/alignment cradles, is activated and the bale is moved to the left sorting/alignment cradle. Rollers in the cradles 24, to minimize friction of moving bales, allow the bale to be moved with minimum power. As the bale moves into the left sorting/alignment cradle and is aligned with the left section of the transport platform, it contacts a pressure switch and power to the sorting mechanism 22 is interrupted. Manual stops on the outside ends of the left and right sorting/aligning cradles insure bale movement is stopped. Once the bale is aligned and stopped, the left sorting/alignment cradle is tilted to the rearward position, releasing the bale onto the rollered transport platform. After the bale has been released down the inclined transport platform, the hydraulic cylinder 21 is repositioned and the left sorting/alignment cradle is moved back to the upright position ready to receive another bale.

Once the bale is released down either the left or right side of the inclined transport platform, gravity provides the impetus for movement of the bale to the rear of the transport platform. The rollers 31 layering the transport platform minimize friction of the bale movement and guide rails 32, adjustable for the width of the bale, provide direction and stability for the bale. The bale continues to the rear until it is stopped by the retaining gate/unloading ramp 33, the intermediate retaining gate 34 or a prior loaded bale. The retaining gate/unloading ramp 33 is a braced ramp, hinged at the bottom to allow it to lower into ground contact and facilitate movement of the bale from the transport platform to ground level (i.e. unload the bale). There are two retaining gates/unloading ramps 33, one for each side of the transport platform. They are controlled by a hydraulic cylinder on each ramp to raise and lower said ramp. Intermediate retainer gates 34, also one for each side of the transport platform, are provided for bale management. These gates, a three feet square section of the roller layered transport platform 44, are hinged on the upgrade side of the gate, approximately seven feet from the rear of the transport platform. Each intermediate retainer gate 34 is controlled by a hydraulic cylinder. By raising the intermediate retaining gate 34 to hold the upgrade bales in place, then lowering the retaining gate/unloading ramp 33, a single bale can be offloaded without disturbing the remainder of the load. The escalator can be raised for transport or when otherwise not in use by activating the escalator hydraulic lift 35.

Figure 4:
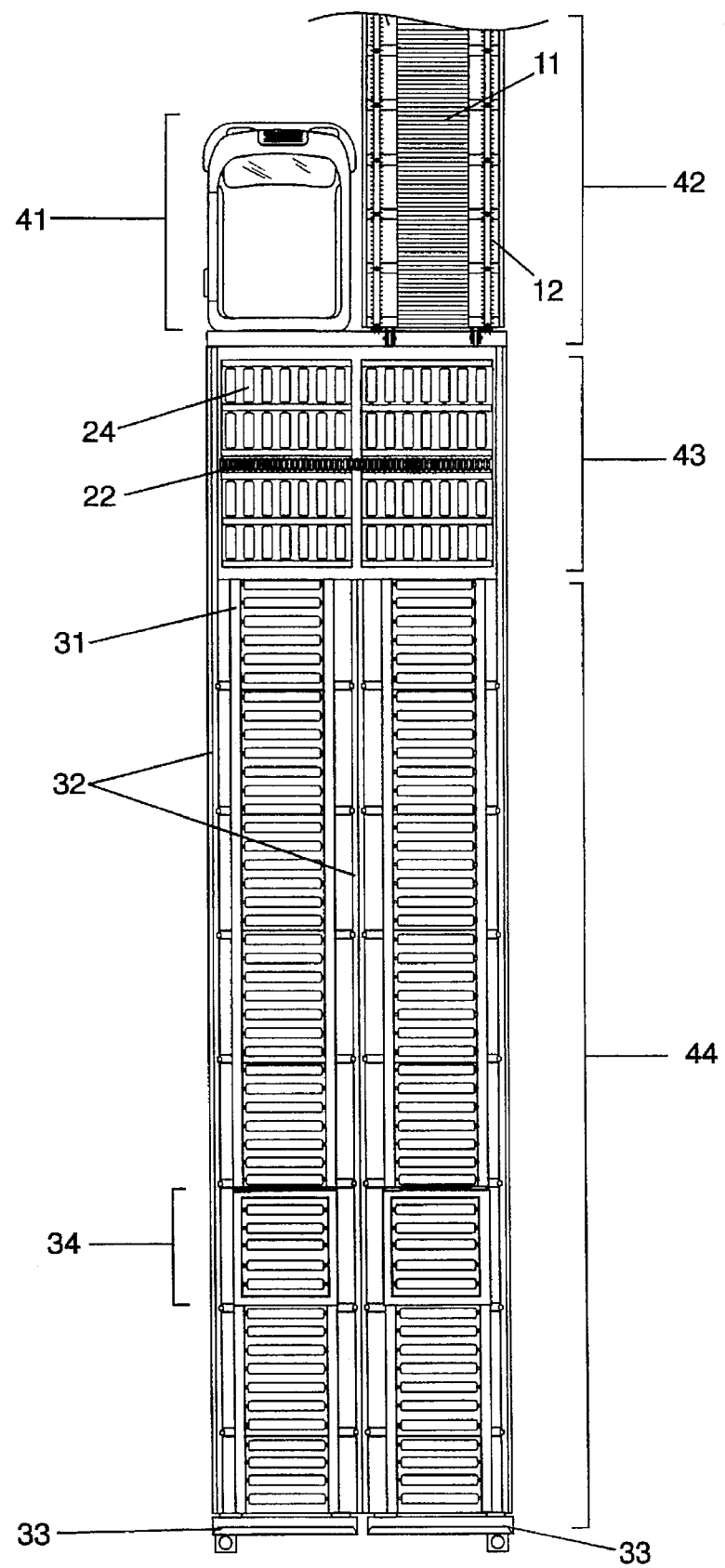
FIG. 4 is an overhead view of the cab, the sorting/aligning cradles, and the transport platform.

An overall view, from the top, of the invention is illustrated in FIG. 4. The cab or operator position 41 is in the upper left area in the optimum configuration. If the invention is mounted on a trailer, this area would contain the tractor-trailer coupling mechanisms. The upper right area 42 illustrates the upper portion of the escalator, intersecting with the right sorting/alignment cradle. The left and right sorting/alignment cradles 43 and the sorting mechanism 22 are located behind the cab/escalator. The inclined, roller layered, transport platform 44 is shown with the adjustable guide rails 32 and the intermediate retaining gates 34 denoted.

Alternative drive or lifting mechanisms such as electric screwjacks or other mechanical devices can be substituted for the hydraulic cylinders in the above embodiment. The foregoing description of the preferred embodiment of the invention has been presented for the purpose of illustration and description. It is not intended to be exhaustive or to limit the invention to the precise form disclosed. Many modifications and variations are possible in the light of the above teaching. It is intended that the scope of the invention be limited not by this detailed description, but rather by the spirit and scope of the claims appended hereto.

I claim:

1. A device to retrieve, load, transport and unload round bales of vegetative matter located on a field, the device comprising:

a) a wheeled chassis having a front portion and right and left sides;

b) an escalator having a frame attached to the right front portion of the chassis at the right side of the chassis, the escalator frame having a front part and right and left sides, the escalator frame being inclined downwardly from its attachment to the chassis, said escalator including an adjustable guide rail on the left side and on the right side of the escalator frame, said escalator including an endless conveyor belt powered by an escalator drive motor, the escalator including movable arms mounted at the front part of said frame, whereby a round bale is guided from the field onto said endless conveyor belt by said movable arms and is moved along the inclined frame by said endless conveyor belt;

c) a sorting/alignment structure including right and left cradles and a sorting drive mechanism, each of the right and left cradles having rollers, the right cradle being tiltable from an upright position into forward and aft positions, the left cradle being tiltable from an upright position into an aft position; and d) a rearwardly declining transport platform having an elongated, rectangular shape, said transport platform having outboard sides, said transport platform including left and right sections which extend longitudinally and are separated by a center guide rail, each of the left and right sections including rollers, an intermediate retaining gate and a retaining/unloading gate, said transport platform having adjustable guide rails mounted on the outboard sides;

whereby said right cradle can tilt into its forward position to receive the round bale from said escalator then return to its upright position, the right cradle can either tilt into its aft position to discharge the bale onto the right section of the transport platform or remain in its upright position while said sorting drive mechanism moves the bale from the right cradle to the left cradle, and said left cradle can tilt from its upright position into its aft position in order to discharge the bale onto the left section of said transport platform.

* * * * *